United States Patent Office 3,650,924
Patented Mar. 21, 1972

3,650,924
METHOD FOR PREVENTING FOULING OF SHIPS, PARTICULARLY SHIPS HAVING SUBSTANTIALLY VERTICAL SIDE SURFACES
Oystein E. Rasmussen, 119 Hosleveien, 1340 Bekkestua, Norway
Filed Apr. 17, 1970, Ser. No. 29,502
Claims priority, application Norway, May 13, 1969, 1,954/69
Int. Cl. B63b 59/00
U.S. Cl. 204—147
5 Claims

ABSTRACT OF THE DISCLOSURE

The invention relates to a method and means for the prevention of fouling of ships having substantially vertical side surfaces. Sea water is subjected to electrolysis and the decomposition products are conveyed to and discharged along the side of the ship. Compressed air is simultaneously conducted to the side of the ship and discharged beyond the decomposition products in an amount to form a dense air blanket which holds the decomposition products adjacent the side of the ship.

Figure 1:
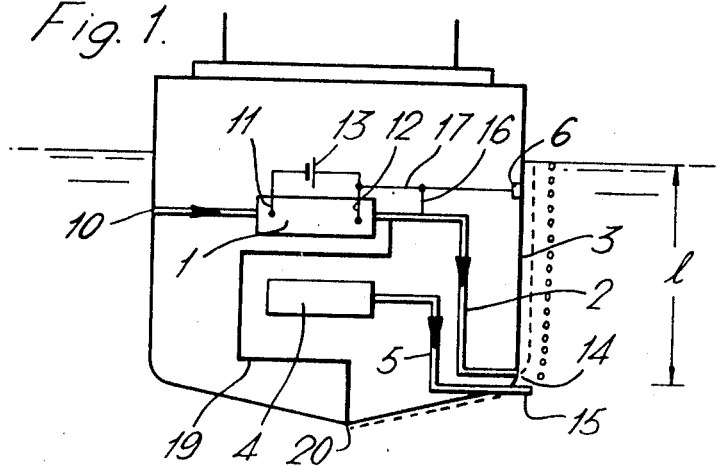

The present invention relates to a method of preventing fouling of ships, and particularly ships having substantially vertical side surfaces, by utilizing the electrolytic decomposition products of sea water. The invention also relates to a means for carrying out the method.

It is known to use the decomposition products of sea water as antifouling substances for marine microorganisms on the underwater surface of ships, an electrode system mounted on the side of the ship being used for this purpose. It is also known to carry out the decomposition in a container on board the ship.

Further known are systems utilizing the decomposition of sea water with an intensifying effect caused by simultaneous dissolving of other antifouling substances. The decomposition of the sea water and the addition of other antifouling substances are carried out in perforated pipes on the side of the ship, the sea water being introduced on one side and the decomposition products being distributed from the other side. Such systems, in the form of pipes, have preferably been mounted at the fore end of the ship, but have also been mounted in the longitudinal direction thereof.

Systems are also known, where liquid chemical antifouling substances are distributed over a surface under water and where gas, for example air, is supplied in order to achieve an improved distribution.

The aim of the present invention is to provide a novel and improved method for the prevention of marine growth on ships. The method is based on the same principles as described hereinabove, but the system is more expediently constructed, so as to achieve an improved control of the supply of antifouling substances, improved distribution and concentration of antifouling substances to the side of the ship, and thereby a fuller and more effective protection. A further object is to achieve an effective distribution of antifouling substances over the substantially vertical surfaces of the ship, as the said antifouling substances tend to float away from the said surfaces.

A disadvantage of the known system is the uncontrolled supply of antifouling substances with no consideration to the prevailing conditions, and the effect of the antifouling substance is thereby random and dependent on currents, the possible movement of the ship, the water conditions and other environmental factors. This disadvantage is eliminated by the method according to the invention, which is characterized in that sea water is conveyed in manner known per se to a container within the ship where it is subjected to electrolysis, and that the electrolysis is carried out to below the saturation point of chlorine in sea water, so that gaseous chlorine is avoided, and that the decomposition products thus dissolved, i.e. antifouling substances, are conveyed in controlled amounts to the side of the ship where a distribution system is arranged, the said system in manner known per se being supplied with air from a compressor, for example, and that antifouling substances and air are discharged into the sea through perforations in the distribution system, whereby the air is discharged substantially beyond the antifouling substances in an amount such that a dense blanket of air is formed, whereby the antifouling substances, due to the density of the air blanket and the turbulence caused by the air, are retained adjacent the side of the ship and float slowly to the surface. A dense blanket of air being formed when the ratio of the distance between the air discharge openings and the distance from the surface of the water is less than 0.02, preferably less than or equal to 0.014.

In this manner, a substantial improvement is achieved in comparison with the prior art, since the electrolysis is undertaken at a location where it may be controlled and effected, and in that it is possible to supply the antifouling substances and air to the ship side as required. It is also an advantage that the antifouling substances are produced on board the ship as required, a store of antifouling substances, possibly in the form of gas, for example, chlorine under pressure, being then unnecessary. A minor and thereby harmless amount on hand, dissolved in water, being all that is necessary in accordance with the invention.

In accordance with a further feature of the invention, the concentration of antifouling substance is measured at the ship side by means of a redox-electrode, for example, this measurement being used for control of supply of antifouling substances from the electrolysis chamber.

In this manner, an automatic adjustment of the system is achieved, so that there is a sufficient amount of antifouling substance present at all times and marine growth is prevented.

Furthermore, according to the invention, the cooling water from the ship may be used as sea water for the electrolysis. A further substantial advantage of the method according to the invention then becomes apparent in the wide possibilities of regulating the temperature of the electrolysis and thus of activating the decomposition process as desired.

A further feature of the invention is that the antifouling substances and the air are discharged into the sea in the area at or through the bilge keel, if this is suitably positioned, and in that the antifouling substances may also be discharged at the bottom area of the ship.

A means for carrying out the method according to the invention, is characterized in that the distribution system consists of discharge openings for the antifouling substances, juxtaposed in horizontal direction, and openings for air, positioned at a greater distance from the ship side. A plurality of perforated areas may also be arranged for the supply of air, positioned in horizontal spaced relationship and between the ship side and the above said air discharge openings.

A further feature of the said means is that a perforated pipe system is used as distribution system.

In the means according to the invention, a pipe system may be used which may be disposed either within the ship or externally of the ship side, discharge openings for the substances to the outer surface of the ship being provided in the first case. Further, air is discharged both vertically and horizontally along the areas of the ship side to form a type of pocket effect, whereby the antifouling substances rise from the bottom in a pocket the sides of which consist of the side of the ship and air on the other three sides. The ship side is thus divided into areas, which permits improved distribution and control of the supply and also ensures a uniform distribution of flow. It is possible that the air and antifouling substances may be forced sideways, however, due to the transversely positioned walls of the pockets such away-flow is restricted and a uniform distribution is maintained over the entire side. The said transverse wall effect may, if desired, be increased by extending the vertical perforated areas along the side of the ship.

The invention is further described in the following with reference to a diagrammatical drawing indicating the principle features of the invention. The drawing illustrates:

FIG. 1 a section of a ship having the principle of the method according to the invention drawn thereon.

Figure 2:
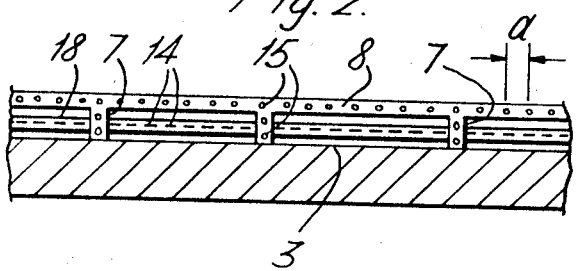
Figure 3:
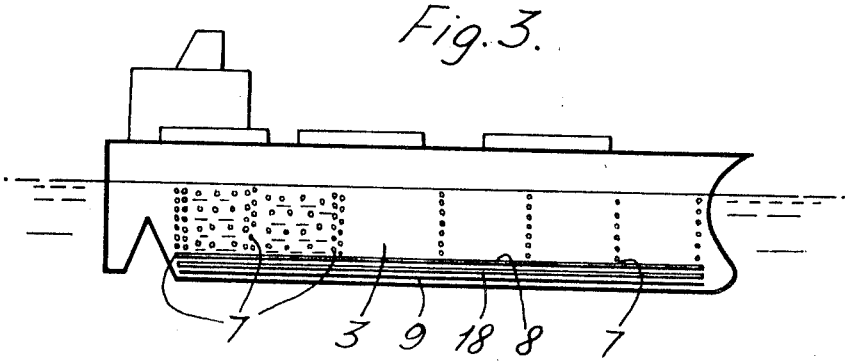

FIG. 2 a section of a ship side seen from above, with a cross section of a pipe arrangement and pockets in accordance with the invention, and FIG. 3 a side view of a ship provided with such means.

On the drawing, the antifouling substance released into the sea is indicated by broken lines, and air is indicated by small circles.

FIG. 1 illustrates the principle of such a system. Sea water is conveyed at 10 directly from the sea or from the cooling water of the ship (not shown), for example to an electrolysis chamber 1 where the water is decomposed to antifouling substances for marine organisms by means of an electrode system 11, 12 which is adapted to receive voltage from a suitable voltage source 13. Since the electrolysis is undertaken in a closed container within the ship, this process can be under continuous control. From the container 1 the decomposition products are conveyed through pipes 2 to the openings 14 at the side of the ship 3, for example, in the area at or in the bilge keel, if this is suitably positioned, where they are released into the sea. Air, for example, from the ship's compressor 4, is conveyed to the same area of the ship side through pipes 5, and the air is released substantially through openings 15 beyond the antifouling substances. A blanket of air is thus formed on the outside of the antifouling substances. The air blanket must obviously be sufficiently dense effectively to prevent the antifouling substances to penetrate the blanket. The density requirements of the air blanket are fulfilled if the ratio of the distance between the air discharge openings $a$ (FIG. 2) and their distance from the surface of the water 1 (FIG. 1) is less than or equal to about 0.02, preferably 0.014. A reference electrode 6, such as a redox-electrode for measuring the concentration of the antifouling substance, may be monuted at a suitable location on the side of the ship, and this measurement is used for control of the amount supplied, through the pipe 2, of antifouling substances from the electrolysis container, and, optionally, for control 17 of the actual electrolysis process.

FIG. 2 shows a section of a ship side seen from above, showing the discharge openings for antifouling substances and air, in this case the openings are in the form of a perforated pipe system at the side of the ship 3, the pipes for air discharge being indicated by 8, and pipes for antifouling substances by 18. Branch pipes 7 are arranged perpendicularly between the side of the ship and the air pipes 8, the said branch pipes 7 being provided with perforations through which air is also discharged into the sea. In this manner, a type of pocket for the antifouling substances is formed between the side of the ship 3, the rising air from the pipes 7 and the outer, rising air layer from the pipes 8. The antifouling substances rise through the said pockets from openings 14 in the pipes 18. By reason of the turbulence effect from the air, which rises more rapidly through the water than the antifouling substances, the antifouling substances remain within the pocket, pressed against the ship's side, and their rise is obstructed, so that they remain at the ship side for a longer period of time, thus giving an improved effect. It is emphasized, however, that the invention is not restricted to such division by pockets.

FIG. 3 discloses how the system is constructed, viewed from the side, with the horizontally positioned pipes 18 and 8, the said pipes being located in the area of the bilge keel 9; the transverse air pipe 7 dividing the side of the ship into sections, so that a distribution of antifouling substances and air is achieved as indicated by symbols at a portion of the ship side.

In order to cover the bottom area of the ship, it is expedient in certain cases to arrange openings for the antifouling substances in the bottom area of the ship also, for example, at 20 on FIG. 1, to which the said substances are conveyed through the pipe 19.

Having described my invention, I claim:

1. Method for preventing marine growth on ships having substantially vertical side surfaces by utilizing the electrolytic decomposition products of sea water comprising conveying sea water to a container within the ship, electrolyzing said sea water to below the saturation point of chlorine in sea water, so that gaseous chlorine is avoided, conveying the electrolytic decomposition products as antifouling substances in controlled amounts to the side of the ship, supplying air from a compressor to the side of the ship, discharging the antifouling substances into the sea, and discharging the air into the sea at a location substantially beyond the location where the antifouling substances are discharged in an amount such that a dense blanket of air is formed, whereby the antifouling substances, due to the density of the air blanket and the tubulence caused by the air, are retained adjacent the side of the ship and float slowly to the surface.

2. Method according to claim 1 further comprising measuring the concentration of antifouling substances at the side of the ship and controlling the amount of antifouling substances supplied from the electrolysis chamber by measurement.

3. Method according to claim 1 wherein the cooling water of the ship is used as the sea water for the electrolysis.

4. Method according to claim 1 wherein the antifouling substances and the air are discharged into the sea at the bilge keel.

5. Method according to claim 1 wherein the antifouling substances are also discharged at the bottom area of the ship.

References Cited
UNITED STATES PATENTS

| | | | |
|---|---|---|---|
| 2,138,831 | 12/1938 | Brammer | 114—222 |
| 3,069,336 | 12/1962 | Waite et al. | 204—196 |
| 3,241,512 | 3/1966 | Green | 204—147 |
| 3,326,174 | 6/1967 | Czekanski | 114—222 |

TA-HSUNG TUNG, Primary Examiner

U.S. Cl. X.R.

114—222; 204—196